United States Patent [19]

Rütschle et al.

[11] Patent Number: 5,628,104
[45] Date of Patent: May 13, 1997

[54] MACHINE TOOL WITH TURNTABLE

[75] Inventors: Eugen Rütschle, Mühlheim/Donau; Hans-Henning Winkler, Tuttlingen, both of Germany

[73] Assignee: Chiron-Werke GmbH & Co. KG, Tuttlingen, Germany

[21] Appl. No.: 31,531

[22] Filed: Mar. 15, 1993

[30] Foreign Application Priority Data

Apr. 4, 1992 [DE] Germany ............ 42 11 348.2

[51] Int. Cl.⁶ .................................................. B23Q 3/00
[52] U.S. Cl. ................. 29/563; 29/33 J; 29/33 P; 29/38 R; 74/826; 198/345.3
[58] Field of Search ............... 29/28 A, 38 C, 29/33 K, 33 J, 563, 39, 48.5 A, 48.5 R, 40; 483/901; 74/826, 813; 198/345.3, 346.1; 408/35

[56] References Cited

U.S. PATENT DOCUMENTS

| | | | |
|---|---|---|---|
| 4,351,096 | 9/1982 | Depweg et al. | 29/38 A |
| 4,380,939 | 4/1983 | Gardner | 74/826 X |
| 4,524,655 | 6/1985 | Waldron et al. | 29/48.5 A |
| 4,636,135 | 1/1987 | Rancon | 483/901 X |
| 4,678,077 | 7/1987 | Bertorello | 198/345.3 |
| 4,706,351 | 11/1987 | Chuang | 29/39 |
| 4,784,421 | 11/1988 | Alvité | 483/901 X |
| 4,793,053 | 12/1988 | Zuccaro et al. | 483/901 X |
| 4,860,413 | 8/1989 | Woodward | 29/38 C |
| 4,872,244 | 10/1989 | Schleich | 29/40 |

FOREIGN PATENT DOCUMENTS

| | | | |
|---|---|---|---|
| 0393260 | 10/1990 | European Pat. Off. | |
| 1301214 | 8/1969 | Germany . | |
| 2216476 | 4/1972 | Germany | 29/48.5 A |
| 2407554 | 9/1974 | Germany | 74/826 |
| 8316776 | 6/1983 | Germany | B23Q 1/16 |
| 3620086 | 6/1986 | Germany | B23Q 11/00 |
| 0238003 | 8/1986 | Germany | 29/38 C |
| 59-110367 | 6/1984 | Japan . | |
| 0238205 | 11/1985 | Japan | 408/35 |
| 539739 | 6/1977 | U.S.S.R. | 29/38 A |

*Primary Examiner*—William R. Briggs
*Attorney, Agent, or Firm*—Pretty, Schroeder, Brueggemann & Clark

[57] ABSTRACT

The invention describes a machine tool with a turntable, which has an upper part with a mounting plate which is arranged so as to pivot with respect to a stationary lower part, and is connected to at least one line to deliver fluids or electrical or mechanical energy to the upper part. The lines are brought in from below through the lower part and can be connected by means of coupling means to the upper part, from where they are connected with connection modules that are arranged on the mounting plate. Serration gear is preferably provided to position the upper part on the lower part, so that each pivoting operation is preceded by a lifting operation and ends with a lowering operation. Preferably, lifting and lowering simultaneously open and close, respectively, the coupling modules.

11 Claims, 2 Drawing Sheets

MACHINE TOOL WITH TURNTABLE

The invention relates to a machine tool with a turntable, which has an upper part with a mounting plate which is arranged so as to pivot about a rotation axis with respect to a stationary lower part, and with at least one line to deliver fluids or electrical or mechanical energy to the upper part.

A machine tool of this kind is known from DE 83 16 776 U1.

It is very common practice with machine tools not only to make the part of the machine that carries the machining tool, for example the spindle head, movable, but moreover also to displace the table supporting the workpiece with a linear or rotary motion. This motion of the table can on the one hand serve to guide the workpiece past a stationary tool for machining. However, with numerically controlled machine tools, turntables are also used so that while a workpiece is being machined on one side of the turntable, the next workpiece can already be mounted on the other side, so that by rotating the table through, for example, 180°, machining of the new workpiece can begin immediately after machining of the old workpiece is complete. While the new workpiece is being machined, the machined workpiece can then be removed, and a new, as yet unmachined workpiece can be mounted in its place.

When workpieces are to be machined on a turntable of the type described above, it is sometimes necessary to create connections from the stationary part of the machine tool to the turntable. These connections can be used to convey energy in the form of compressed air or hydraulic fluid from the machine tool to the turntable, or to exchange signals between the machine tool and the workpiece table. Such is typically the case when the workpiece is held on the workpiece table by means of a clamping device actuated by an outside force, or a dividing attachment. Actuation of the clamping device and the dividing attachment requires energy, which can be delivered, for example, in the form of electrical current, compressed air, or hydraulic fluid. In addition, control signals for specific actuation of these devices can be transferred to the workpiece table, just as signals from limit switches, sensors, and the like, arranged on the devices, can be transferred from the workpiece table back to the machine tool.

From the aforesaid DE 83 16 776 U1, it is a known process to create a connection between the stationary part of the machine tool and the turntable by the fact that at least one electrical line and/or fluid line is guided, through the rotation axis of the turntable and concentrically therewith, from the underside of the table to the top side. Arranged in the center of the turntable is an appropriate coupling that can rotate with the table. Inside the table, a flexible line segment is arranged inside a box so that the line segment allows limited rotary motion, for example through 180°, of the turntable. One end of the line segment is connected to the central coupling, and the other end of the line segment is guided downward out of the turntable, for example through a stationary central tube.

It has been found in practice that the known machine tool does not meet the requirements of all applications; in particular, the line segment with limited rotation requires considerable space in workpiece table, and the connections that must be made are somewhat complicated and can therefore be a source of malfunctions under extreme stress. Moreover, the known arrangement becomes more complex and difficult, the more lines need to be guided to the workpiece table. Lastly, the rotation angle is of course limited by the limited rotation of the line segment.

DE 36 20 086 C2 has disclosed a further machine tool in which a workpiece table can be rotated alternately in opposite directions through an angle of 180°, in such a way that each half of the surface of the workpiece table alternately constitutes a machining side in the spindle head working region, and a placement side at a distance from the working region of the spindle. To convey signals and/or energy from a stationary part of the machine tool to the workpiece table, the lines are connected above the workpiece table, at a point in the vicinity of the axis, to the stationary part of the machine tool, and, hanging down loosely, are connected to a connector box of the workpiece table.

In this manner, the loosely hanging lines can be attached at both ends using commercially available connector pieces, which are easy accessible. Because the lines are attached at the top in the vicinity of the rotation axis of the workpiece table, the result is a symmetrical motion, which produces only minimal mechanical deformation of the lines, when the workpiece table is rotated back and forth through 180°.

The freely hanging lines, however, have proved to be disadvantageous. They not only can be mechanically damaged, but also are continuously exposed to the effect of cooling lubricants, which can have an aggressive effect on plastic and rubber insulation. Moreover, the hanging lines can prove problematical when operating personnel need to perform mounting or maintenance work in the vicinity of the turntable. Lastly, one prerequisite with the known arrangement is that the turntable be alternately pivoted in opposite directions. Pivoting of the turntable in the same rotation direction each time is not possible, however, since this cause the lines to be wound up and ultimately pulled out.

The underlying object of the invention is therefore to improve a machine tool of the aforesaid type so as to allow simple and reliable guidance of lines from the stationary part of the machine tool to the turntable, and so that the machining space above the turntable is encroached upon as little as possible.

According to the present invention, this object is achieved by the fact that in a machine tool of the aforesaid type, the line is guided between the upper part and lower part by means of coupling means, which is opened at the beginning of a pivoting operation and closed at the end of a pivoting operation.

Because the lines are connected from below, by means of coupling means, from the stationary lower part to the upper part, the entire line system is located below the turntable, so that it is largely shielded from environmental influences, especially if the turntable is of an encapsulated design. The space above the turntable, however, is entirely free of lines, thus eliminating any encroachment on the working region or obstruction to operating personnel.

The coupling means can consist of coupling elements known in the art, which are arranged so that the coupling means are detached at the beginning of a pivoting operation and attached at the end of a pivoting operation. This allows secure connection even of numerous lines of different kinds, since many versions of such coupling elements are known and proven as means of transferring electrical signals or energy, or connecting pneumatic or hydraulic lines.

Different coupling elements can be arranged at predefined angular positions on the upper part of the turntable in order to create a connection to the upper part of the turntable in different angular positions. This makes it possible to create a line connection not only when the turntable pivots through 180° as it most usually does, but also when the turntable pivots through an angle of, for example, only 90°.

Since there is no permanent line connection between the stationary lower part of the turntable and the rotating upper part of the turntable, the turntable can be rotated in the same direction as often as desired. This capability can be advantageously utilized when machining a variety of workpieces, and moreover the rotary drive can be of a simpler design if there is no need to reverse the direction of rotation.

In a preferred development of the invention, means for lifting and pivoting and subsequently lowering the upper part onto the lower part is provided, and the coupling means is opened and closed by the lifting and lowering movements, respectively, that occur with each pivoting operation.

This feature utilizes the fact that positioning elements are generally provided between the upper part and lower part of the turntable for precise positioning of the turntable, causing the turntable to reach its precise end position when the turntable is lowered.

The coupling means between the upper part and lower part are located in precisely such a way that they are opened when the turntable is lifted at the beginning of each pivoting motion, and closed by the lowering motion at the end of each pivoting motion. In this manner, the lifting and lowering movements required in any event during pivoting of the turntable can be advantageously utilized to detach and attach the line connections.

A further embodiment of the invention has at least one upper and one lower coupling module, which are separated from or connected to one another in the course of the lifting or lowering movements, respectively.

With this feature, prefabricated coupling modules can advantageously be used for connection, guaranteeing reliable transfers.

In a further embodiment of the invention, at least one upper and lower coupling module pair is provided for simultaneous connection of a plurality of individual lines.

If it is necessary to connect a plurality of individual lines, for example if electrical signals need to be transferred and compressed air also needs to be delivered, the various individual lines can be combined in this manner, and transferred by means of a single, or a few, coupling module pairs. Since simultaneous connection of a plurality of individual lines by means of a coupling module is a proven technology, this feature reduces space requirements and ensures a secure connection.

In a further advantageous embodiment of the invention, at least one coupling is configured as a shaft/hub connection to transfer rotation energy to the upper part.

The advantage of this feature is that it makes possible direct transfer of mechanical energy, in a simple manner, to the upper part of the turntable.

In a particularly preferred variant of the aforesaid capability, the shaft/hub connection can be connected to a dividing apparatus.

This makes it possible to use a dividing apparatus on the mounting plate of the upper part with no need to provide a separate drive for that purpose on the mounting plate of the turntable, thus reducing the space requirement in this region.

In a further advantageous embodiment of the invention, toothed gear elements are provided on the upper part and the lower part which engage with one another when the upper part is lowered onto the lower part to position the turntable.

This guarantees precise positioning of the turntable in a particularly reliable manner. The drive which raises, pivots, and lowers the turntable needs to have only a low level of pivoting accuracy, sufficient to ensure engagement into the respective gear elements.

In an advantageous development, a serration gear is provided for this purpose on the upper part and lower part.

This kind of gear has a particularly high positioning accuracy and is suitable for transferring large forces that can occur in the machining of workpieces fastened to the turntable.

In a further advantageous embodiment of the invention, at least one connection module, to which at least one line is connected, is provided on the mounting plate.

The advantage of this feature is that the line connections between the workpiece or any other auxiliary units and the turntable can be made in an easy manner as quick-release connections, for example as plug-in, bayonet, or threaded connections.

Although it is possible in principle to arrange the coupling means between the upper part and lower part at any desired positions, it has proven to be especially advantageous if the coupling means are arranged with mirror symmetry on either side of the separating line between machining side and placement side.

If the turntable is being pivoted in each case through 180° in order to switch workpieces between the machining side and the placement side, with this arrangement the lines can be guided vertically upward from the coupling means of the upper part of the turntable to corresponding connection modules which are then easily accessible, regardless of the position of the turntable, from both the machining side and the placement side.

Furthermore, it is readily possible to provide a single connection module in the center of the mounting plate, connected to both coupling means of the upper part. Moreover, it is of course also possible to provide further coupling module pairs between upper part and lower part, as well as further connection modules on the mounting plate.

In a further embodiment of the invention, the means for lifting, pivoting, and lowering the upper part has a central shaft that is rigidly connected at its top end to the upper part, and that is connected to a lifting and rotating drive to lift, pivot, and lower the upper part.

This makes it possible to arrange the lifting and rotating drive below the turntable in the vicinity of the machine bed, thus reducing space requirements.

It is understood that the features mentioned above and those yet to be explained below can be used not only in the respective combinations indicated, but also in other combinations or in isolation, without leaving the context of the present invention.

An exemplary embodiment of the invention is depicted in the drawings and will be explained further in the description below. In the drawings:

FIG. 1 depicts a turntable 14 of a machine tool according to the invention, which is labeled in its entirety with the number 10.

Figure 1:
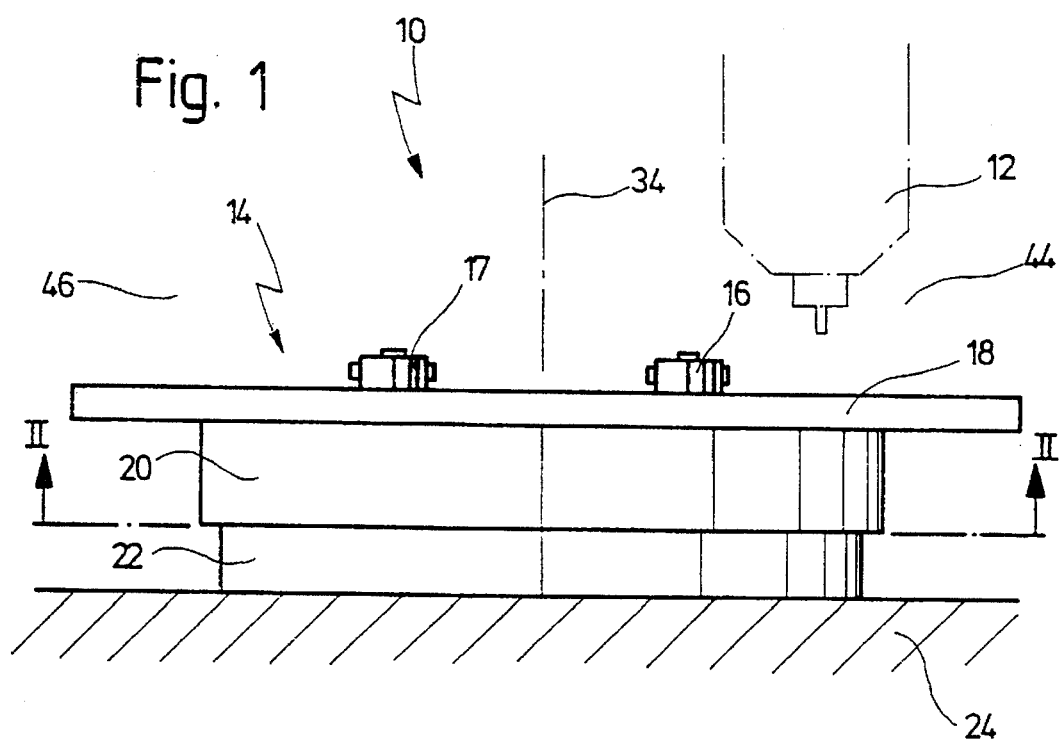
FIG. 1 shows a simplified schematic view of the turntable of a machine tool according to the invention.

The turntable 14 can pivot through 180° in order to machine workpieces that are clamped onto the turntable on its placement side and prepared for machining, after the turntable is pivoted through 180° to the machining side. Indicated schematically on the machining side is the spindle head 12; depiction of the other components of the machine tool has been omitted, since they are basically known.

The turntable 14 has a cylindrical upper part 20, on the top side of which a flat mounting plate 18 is provided to receive workpieces. The upper part 20 is arranged so as to rotate about a rotation axis 34, and rests on a cylindrical lower part 22 concentric therewith, that is mounted on the machine bed 24.

Arranged on the mounting plate 18 are two connection modules 16, 17 that are connected, in a manner to be described later, to lines which deliver electrical or mechanical energy or convey electrical signals, to pneumatic or hydraulic lines, or to lines for the delivery of cooling lubricant. The connection modules 16, 17 allow these lines to be connected in a simple manner by means of plug-in connections.

Figure 2:
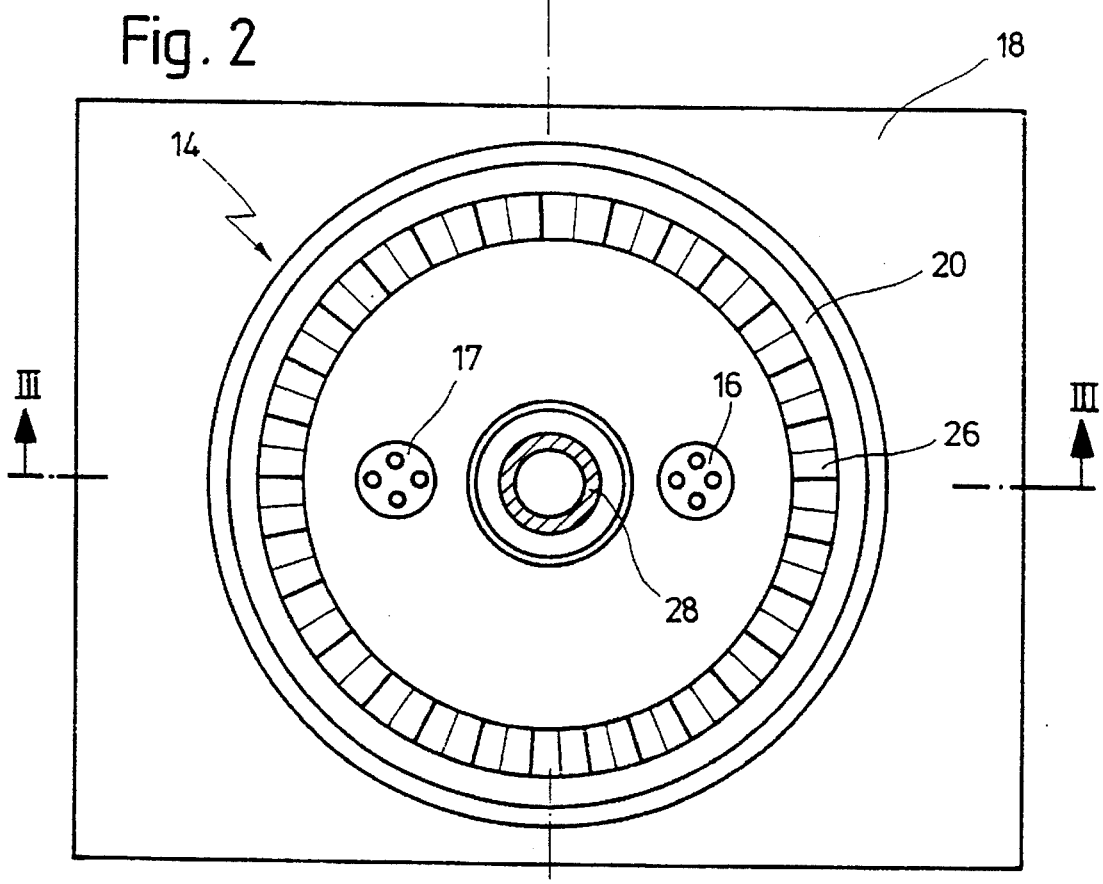
FIG. 2 shows a section through the turntable according to FIG. 1, along line II—II.

The machine tool 10, which is surrounded by a splash protection booth (not depicted), is divided by the turntable 14 into a machining side 44 and a placement side 46, which are separated from one another by a separation line 42 running through the center of the turntable (FIG. 2).

Workpieces for machining are first clamped onto the mounting plate 18 of the turntable 14 on the placement side 46, and prepared for machining. If necessary, corresponding supply or signal lines are attached, and connected to the connection module 17. At the same time, machining of a previously clamped workpiece can be performed on the machining side 44 opposite.

As soon as the machining procedure is complete, the turntable 14 is pivoted through 180°, and machining of the workpiece previously clamped onto the placement side 46 can begin. The workpiece that has already been machined can now be unclamped, and a new workpiece can be prepared for subsequent machining.

As is evident from FIGS. 2 and 3, a central shaft 28 is provided to drive the turntable 14, said shaft being guided through the lower part 22 from below and bolted at its upper end surface to the upper part 20. The shaft 28 is connected at its lower end to a lifting and rotating drive with which the upper part 20 can be lifted up from the lower part 22, pivoted, and lowered back down onto the lower part 22. Provided on the underside of the upper part 20 is a circumferential toothed ring 26 with a serration gear, in which the serrated side points downward. A corresponding toothed ring 27 is provided on the top side of the lower part 22, so that when the upper part 20 is lowered, its toothed ring 26 rests on the toothed ring 27 of the lower part 22. The serration gear guarantees accurate angular and vertical positioning. The serration gear is moreover self-centering, so that centering of the upper part 20 on the lower part 22 is not necessary. A cylindrical skirt 48 projecting downward in a cup shape on the outside of the upper part 20, which is in sliding contact with a correspondingly shaped cylindrical skirt 50 on the outside of the lower part 22, serves merely to encapsulate the turntable 14 with respect to environmental influences such as dirt, cooling lubricant, and the like, but not to center the upper part 20 on the lower part 22. In the interest of better sealing, a seal (not depicted) can additionally be provided between the two skirt surfaces 48 and 50.

The connection modules 16, 17 are connected by means of vertical supply lines 38a, 40a to coupling modules 30a, 32a that are arranged on the underside of the upper part 20.

Corresponding coupling modules 30b, 32b—to which the supply lines 38b, 40b, which are guided in from below through the machine bed, are connected—are provided opposite these coupling modules 30a, 32a on the lower part 22.

Figure 3:
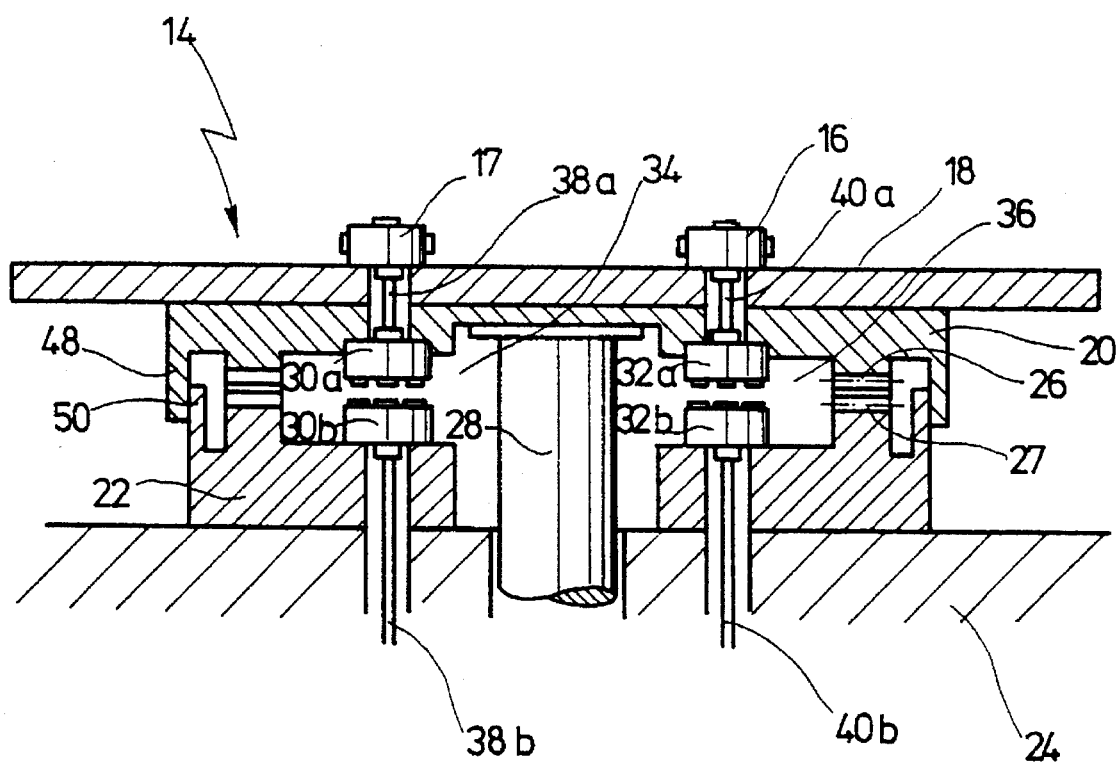
FIG. 3 shows a section through the turntable according to FIG. 2, along line III—III.

In the position shown in FIG. 3, the upper part 20 has been lifted away from the lower part 22 by the shaft 28, so that the toothed rings 26, 27 and the coupling modules 30a, 30b and 32a, 32b are separated from one another.

In this position the upper part 20 can pivot with respect to the lower part 22; in the example shown, pivoting through 180° is provided for.

Once the predefined pivot angle has been reached, the upper part 20 can be lowered back down onto the lower part 22 by lowering the shaft 28, until the toothed ring 26 of the upper part 20 comes to rest on the splined ring 27 of the lower part 22. At the same time the coupling modules 30a, 30b and 32a, 32b are connected to one another, as a result of which all the lines 38a, 38b and 40a, 40b, which in FIG. 3 are depicted only schematically as bundled lines, are connected to one another.

In this manner the connection modules 16, 17 are connected in each end position to the supply lines, regardless of the angular position of the turntable.

It is possible to connect different lines to the machining side and the placement side of the turntable, for example if a compressed air connection is required only on the placement side but is not necessary on the machining side. However, if the same lines are required on both the machining side and the placement side, it is also possible to arrange a central connection module, which is then connected to both coupling modules 30a, 32a of the upper part 20, on the top side of the mounting plate 18. Moreover, further coupling modules can of course also be provided to create further line connections between the upper part 20 and lower part 22, or further connection modules can be arranged on the mounting plate.

We claim:

1. A machine tool, comprising:

a turntable having a stationary lower part and an upper part with a mounting plate which is arranged so as to pivot about a pivot axis with respect to said stationary lower part, said turntable for supporting a workpiece to be machined;

means for lifting and pivoting and subsequently lowering the upper part onto the lower part;

a plurality of individual lines to deliver energy to said upper part;

at least one coupling means provided between said upper and lower parts for guiding said lines, said coupling means including an upper and a lower coupling module which are separated from or connected to one another in the course of the lifting or lowering movements, respectively, wherein at least one upper and lower coupling module are connected together during the lowering movement to thereby couple said plurality of individual lines simultaneously; and wherein said coupling means is opened and closed by the lifting and lowering movements, respectively, that occur in connection with each pivoting operation, such that said coupling means is opened prior to pivoting said upper part about said pivot axis and closed when pivoting of said upper part has finished.

2. A machine tool according to claim 1, further comprising a mechanism that selectively restrains said upper part from pivoting with respect to said lower part.

3. A machine tool according to claim 1, further comprising a toothed ring borne by one of said upper and lower parts that engages the other of said upper and lower parts to restrain their relative pivotal movement about said pivot axis, at least when said upper part is lowered onto said lower part.

4. A machine tool, according to claim 1, wherein each of said upper and lower parts comprises gear tooth elements which engage with one another when said upper part is lowered onto said lower part to position said turntable.

5. A machine tool, according to claim 1, wherein said gear tooth elements comprise a serration gear.

6. A machine tool, according to claim 1, wherein at least one of said coupling modules is provided on said mounting plate and is connected to at least one of said lines.

7. A machine tool, according to claim 1, wherein said turntable divides said machine tool into a machining side for machining workpieces and a placement side for placing or clamping workpieces, said placement and machining sides being separated by a separation line extending through the center of said turntable and wherein said coupling means are arranged on either side of said separating line mirror-symmetrically to one another.

8. A machine tool, according to claim 1, wherein said means for lifting, pivoting, and lowering said upper part includes a central shaft having a top end that is rigidly connected to said upper part, and wherein a lifting and rotating drive is provided which is connected to said central shaft for lifting, pivoting, and lowering said upper part.

9. A machine tool, comprising:

a turntable having a stationary lower part and an upper part with a mounting plate which is arranged so as to pivot about a pivot axis with respect to said stationary lower part, said turntable for supporting a workpiece to be machined;

means for lifting and pivoting and subsequently lowering the upper part onto the lower part;

a plurality of individual lines to deliver fluid to said upper part;

at least one coupling means provided between said upper and lower parts for guiding said lines, said coupling means including one upper and lower coupling module which are alternatively separated from and connected to one another in the course of the lifting or lowering movements, respectively, wherein at least one upper and lower coupling module are connected together during the lowering movement to thereby couple said plurality of individual lines simultaneously; and wherein said coupling means is opened and closed by the lifting and lowering movements, respectively, that occur in connection with each pivoting operation, such that said coupling means is opened prior to pivoting said upper part about said pivot axis and closed after pivoting of said upper part has finished.

10. A machine tool, comprising:

a turntable having a stationary lower part and an upper part with a mounting plate which is arranged so as to pivot about a pivot axis with respect to said stationary lower part, wherein said turntable divides said machine tool into a machining side for machining workpieces and a placement side for placing or clamping workpieces, said placement and machining sides being separated by a separation line extending through the center of said turntable;

means for lifting and pivoting and subsequently lowering the upper part with respect to the lower part;

at least one line to deliver energy to said upper part;

at least one coupling means provided between said upper and lower parts for guiding said line, said coupling means including one upper and lower coupling module which are alternatively separated from and connected to one another in the course of the lifting and lowering movements, respectively, wherein said coupling means are arranged on either side of said separating line mirror-symmetrically to one another; and wherein said coupling means is opened and closed by the lifting and lowering movements, respectively, that occur in connection with each pivoting operation, such that said coupling means is opened prior to pivoting said upper part about said pivot axis and closed after pivoting of said upper part has finished.

11. A machine tool, comprising:

a turntable having a stationary lower part and an upper part with a mounting plate which is arranged so as to pivot about a pivot axis with respect to said stationary lower part, wherein said turntable divides said machine tool into a machining side for machining workpieces and a placement side for placing or clamping workpieces, said placement and machining sides being separated by a separation line extending through the center of said turntable;

means for lifting and pivoting and subsequently lowering the upper part with respect to the lower part;

at least one line to deliver fluid to said upper part;

at least one coupling means provided between said upper and lower parts for guiding said line, said coupling means including one upper and one lower coupling module which are alternatively separated from and connected to one another in the course of the lifting and lowering movements, respectively, wherein said coupling means are arranged on either side of said separating line mirror-symmetrically to one another; and wherein said coupling means is opened and closed by the lifting and lowering movements, respectively, that occur in connection with each pivoting operation, such that said coupling means is opened prior to pivoting said upper part about said pivot axis and closed after pivoting of said upper part has finished.

* * * * *